United States Patent
Brion

(10) Patent No.: US 10,874,096 B1
(45) Date of Patent: Dec. 29, 2020

(54) GARMENT COVERING FOR ODOR CONTROL AND HEIGHT-SPECIFIC SCENT DISPERSAL IN NATURE

(71) Applicant: James Brion, Stevensville, MT (US)

(72) Inventor: James Brion, Stevensville, MT (US)

(*) Notice: Subject to any disclaimer, the term of this patent is extended or adjusted under 35 U.S.C. 154(b) by 144 days.

(21) Appl. No.: 16/246,516

(22) Filed: Jan. 13, 2019

Related U.S. Application Data

(60) Provisional application No. 62/617,207, filed on Jan. 13, 2018.

(51) Int. Cl.
*A01M 31/00* (2006.01)
*A41D 17/02* (2006.01)
*A41D 27/08* (2006.01)
*A41D 31/04* (2019.01)

(52) U.S. Cl.
CPC ........... *A01M 31/008* (2013.01); *A41D 17/02* (2013.01); *A41D 27/08* (2013.01); *A41D 31/04* (2019.02); *A41D 2300/22* (2013.01); *A41D 2400/36* (2013.01); *A41D 2600/108* (2013.01)

(58) Field of Classification Search
CPC ..... A01M 31/008; A41D 17/02; A41D 27/08; A41D 31/04; A41D 2300/22; A41D 2400/36; A41D 2600/108
USPC .................................................. 239/36; 43/1
See application file for complete search history.

(56) References Cited

U.S. PATENT DOCUMENTS

| | | | |
|---|---|---|---|
| 4,186,502 A * | 2/1980 | Foster | A43B 3/0031 36/1 |
| 4,302,899 A * | 12/1981 | DeHart | A01M 31/008 43/1 |
| 4,722,477 A * | 2/1988 | Floyd | A01M 31/008 224/267 |
| 4,984,303 A | 1/1991 | Ross | |
| 5,005,215 A | 4/1991 | McIlquham | |
| 5,067,260 A | 11/1991 | Jenkins, Jr. | |
| 5,074,439 A * | 12/1991 | Wilcox | A01M 31/008 206/38 |
| 5,148,949 A * | 9/1992 | Luca | A01K 27/006 222/175 |
| 6,353,939 B1 | 3/2002 | Arber | |
| 7,093,770 B1 | 8/2006 | Moran | |
| 7,531,471 B2 | 5/2009 | Quincy, III | |
| 7,655,829 B2 | 2/2010 | MacDonald et al. | |
| 7,805,769 B2 | 10/2010 | Hunt | |

(Continued)

*Primary Examiner* — Darren W Gorman
(74) *Attorney, Agent, or Firm* — Sarah J. Rhoades

(57) ABSTRACT

A disposable, tubular leggings garment that is pulled over a user's legs to simultaneously keep human scent from coming into contact with nature while also allowing for the dispersal of cover and attractant scents at a height that is familiar to animals. The invention conveys the ability to barricade human scent inside the garment while optionally distributing interdigital deer scent at the bottom of the foot where it actually exists on a deer; tarsal gland scent at the knee level; estrous scent at the hind-end level; or local food source scents below knee level. This is all provided in one disposable package with sufficient guidance so that even a novice hunter can immediately understand and use the garment, system and associated methods. This invention essentially converts human encroachment into a deer's habitat into a friendlier or even attractive occurrence and keeps hunting areas more game-rich through the season.

26 Claims, 5 Drawing Sheets

(56) References Cited

U.S. PATENT DOCUMENTS

| | | |
|---|---|---|
| 7,816,285 B2 | 10/2010 | MacDonald et al. |
| 8,151,492 B2 * | 4/2012 | Rackiewicz ........... A43B 23/07 |
| | | 36/136 |
| 8,168,852 B2 | 5/2012 | Quincy, III |
| 8,250,675 B2 | 8/2012 | Duncan |
| 8,405,058 B2 | 3/2013 | Slinkard et al. |
| 9,532,615 B2 | 1/2017 | Radefeldt |
| 2004/0107474 A1 | 6/2004 | Sesselmann |
| 2005/0034221 A1 | 2/2005 | Ridpath et al. |
| 2006/0137223 A1 | 6/2006 | Ziccarelli |
| 2007/0212253 A1 * | 9/2007 | Elrod ...................... A61L 9/015 |
| | | 422/5 |
| 2009/0255027 A1 | 10/2009 | Laitmon |
| 2010/0005559 A1 | 1/2010 | Majerfeld |
| 2010/0115795 A1 | 5/2010 | Stead |
| 2011/0258874 A1 | 10/2011 | Riddleberger |
| 2012/0174289 A1 | 7/2012 | Lopez |
| 2014/0310996 A1 * | 10/2014 | Waters ................. A43B 3/0031 |
| | | 36/136 |
| 2018/0153230 A1 * | 6/2018 | Verner ................. A01M 31/008 |

\* cited by examiner

GARMENT COVERING FOR ODOR CONTROL AND HEIGHT-SPECIFIC SCENT DISPERSAL IN NATURE

CROSS-REFERENCE TO RELATED APPLICATIONS

The present application claims priority under 35 U.S.C. § 119(e) to U.S. provisional patent application No. 62/617,207 entitled "Garment Covering for Scent Control and Scent Disbursement in Nature" filed on Jan. 13, 2018. The entire disclosure of that patent application is hereby incorporated into this application disclosure by reference.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIAL SUBMITTED ON A COMPACT DISC

Not applicable.

BACKGROUND OF THE INVENTION

1. Field of the Invention

This invention relates to combined scent control and dispersal, and more particularly to garment coverings for use in hunting, photography and wildlife management.

2. Description of the Related Art

Animals leave an area when they sense a human presence. When a man walks in the woods he is accompanied by scents and odors which animals recognize and associate with humans. He distributes these scents in the air around him and also leaves a scent trail on vegetation as he walks. Prior innovations have discovered that by blocking his scent, an outdoorsman can experience a more natural outdoor environment. Many products exist in the marketplace to absorb, cover or mask odors the natural world recognizes as "human." Prior art in this area includes scent blocking clothing, scent reduction sprays, and liquid attractant scents including food scents and reproductive scents.

Even though scent blocking clothing is very expensive, it only does a fair job of controlling human scent from within and it does not block 100% of that scent. Garments of scent blocking clothing intended for single use are too expensive for the average consumer, while garments of this type intended for repeat use are easily compromised as they inevitably come into direct contact with other, human-specific scents. It is normal for scent blocking garments to have odors transferred to them between the time a human dons the garment and the time when the garment may have an olfactory interaction with an animal. For example, by the time a hunter begins his walk to the hunting stand, the clothing will be tainted on the outer layer with other smells that a hunter accumulates from his interaction with the pre-hunting environment including his house, his truck, his ATV, etc. These accumulated scents may include, but are not limited to, fuel and oil from the gas station, pet smell transfers from dogs or cats, food smells from breakfast before the hunt, or everyday smells from the car seat, etc.

Scent blocking clothing is only effective in controlling the hunter's own "active scent," meaning the scent that emanates from a hunter while he is currently standing in a particular spot or sitting in his hunting stand or blind. The hunters scent emanates from the breathable clothing used by prior inventions. This type of functionality only helps reduce the chances that a deer downwind will be alerted to a human's presence while on a hunting stand. Scent blocking clothing does not effectively control "residual scent." Residual scent is the scent left on the trail, grass, brush and other foliage while a human makes his way to a hunting stand or other stationary location. Most residual scents are left on grasses and brush at or below thigh level—which is also approximately the height of a deer at the back (30-40 inches from the ground). Significantly larger numbers of game are spooked from a hunting area in the other 16-20 hours of the day—and especially night—when the hunter has long since departed the hunting area. Current products only serve the hunter for a few days before all animals, especially nocturnal ones, have been well alerted to a hunter's presence due to his residual scent trail in and out of his stand, day after day.

Some argue that scent elimination sprays are mildly effective to counteract the effects of scent accumulation from the human world. It is convenient to think that one can spray oneself down with scent-killer and be invisible to a deer, but that isn't the case. Though scent sprays can reduce human odor, they cannot completely mask odors from the human world and as a result animals such as deer will detect a human's presence.

Animals including deer have an advanced sense of smell and can detect layers of odors on a human's body and the transfer of those odors left on vegetation in the field. Through stereo olfaction a deer can detect the direction a human has walked. A deer can also detect what another deer recently fed on, its status in the herd, and its reproductive readiness. Based on the odors left behind by a human, a deer will detect what hour of the day the human passed by and the deer can continue to detect these odors for hours, even days after the source of the odor has left the area.

Some inventions have provided scents for humans to dispense in nature, usually as a tool for hunting. These mechanisms and methods to proactively dispense scents are meant to attract game animals, typically for the hunting of specific animals. Attractant scents, which imitate food, does in estrus, bucks in rut, and deer scents in general, are available in liquid form and those liquids can be used to attract animals. However, the means of distributing those products is unnatural to a deer's senses. What's more, only a professional hunter with decades of experience would know what scent, or combination of scents to use throughout the year, even if he had the means to distribute the scent in a manner as to be believable by a deer. Prior attempts to combine scent blocking features of clothing with scent-reducing sprays have resulted in products which are ineffective.

BRIEF SUMMARY OF THE INVENTION

The present invention is an improved leg cover in the form of a garment, typically worn over other clothes by a user entering nature. The garment is made of a non-breathable textile and is constructed to cover the legs of a human seeking to mask his presence in an outdoor environment. The garment has an interior and an exterior and forms a scent barrier between the human and nature. Human scents are retained within the interior of the garment, and scents are intentionally deposited for selective exposure on the exterior of the garment. The various scents are selected and applied in various sections of the garment for scent dispersal at heights which correspond to where those scents occur naturally in the outdoor environment. For example, a single scent dispersal structure is located near at least one hip, thigh or upper leg area of the user and the structure is impregnated with female animal estrous scents. Another section of scent dispersal structure calls for two or more structures to be located near at least one knee of the user and the structure is impregnated with selectable tarsal scents of either a male animal dominate scent or male animal subordinate scent. The user would choose to expose only one or the other male scents depending on the time of year and the objectives for his trip or hunt. The user may choose to remove more than one of the scent covers from the first (doe) and second (buck) scent sections. Yet another section of scent dispersal structure is located near the calf, shin, or lower leg of the user. The scent dispersal structures in this section appear in multiples of 3 or more and have options for exposing scents from a selection of food or plant scents which serve to give the human additional cover and make him smell less threatening or even more inviting to the wildlife. An additional section of scent dispersal structures is located on or near the user's foot and is impregnated with animal interdigital glandular scents which are normally emitted from a deer's hoof and disguise the presence of an outsider in the area. Each of the scent dispersal structures contain for dispersal scents occurring within the structures, such as through microencapsulation. The scent emitting structures are then protected by a cover that can be removed by the user to expose the scents. The user grabs a thumb tab to remove the cover and expose the scent emitting microcapsules while minimizing his contact with the garment. The user can use ties or belt structures to securely fasten the garment cover to the user's waist area. If the garment cover is presented as chaps only, then the ties may fasten behind or in front of the user's waist. The preferred embodiment of the garment will fasten above the hip of the user. The garment has cinching above and below the knee in order to hold the garment in place while the user moves. The cinching mechanism supports locational orientation of the sections of scent dispersal structures on the user's leg. Finally, a banded stirrup loops under the user's shoe to secure the hunting leg cover to the foot of the user, likely between the user's heal and toe area.

The garment is desirably made of tubular leggings. The garment may also be formed as chaps. In the preferred embodiment, the garment is disposable. The user pulls the legs of the garment over his legs to simultaneously keep human scent from coming into contact with vegetation while allowing for the dispersal of cover and attractant scents in a manner more consistent with a deer's natural and familiar environment. The present invention allows a hunter to walk through the woods without transferring human-related scents on the trail or foliage. At the same time, the present invention dispenses deer-related scents (food, glandular scents, reproductive scents) on the trail and through the foliage in a manner which is consistent with the ways in which a deer is accustomed to having those scents presented. The present invention allows a user options to activate only those scents that are applicable to the certain situation or circumstances on a given day. The user can choose to activate applicable food scents, dominant buck scent, doe estrous scent, or general deer scent, etc., in order to manipulate his aromatic environment. Following simple instructions for the time of year, a user can correctly apply the selection options offered by the present invention. Selections based on animals sought and available food sources in the area will quickly determine the user's application of the aspects of the present invention.

The invention provides humans with the ability to barricade human scents inside the provided fabric garment cover while at the same time providing a means to distribute scents familiar to deer. Interdigital deer scents are distributed from the bottom of the human's foot—consistent with where it actually exists on a deer's hoof. Tarsal gland scents are distributed at the, expected, knee level. Estrous scents are distributed from a height consistent with the height of a hind end and the urethra of a female deer. As additional advantage, a hunter can apply local food source scents all in one disposable package. The present invention is presented to users in a logical and understandable manner so that even a novice hunter can immediately apply the features of the invention in the real world and do so correctly. Correct use of these sophisticated masking and attracting scents will prevent a hunter from unwittingly sabotaging his own animal encounter and more importantly from continuously tainting his hunting area with more and more unnatural human scents every day he enters the hunting area. The use of the present invention will promote the number of wildlife and daylight activity of the wildlife in the area. This product inhibits the dispersal of a human's scent, normally disseminated while walking, and helps to prevent its transfer to vegetation where the lingering, residual scent would otherwise remain overnight and for days after the hunter has left the field, that residual scent effectively deterring cumulatively more game than will be impacted by the hunter's active scent.

The inventor has spent the past 30 years as an outfitter and hunting consultant and he specializes in managing parcels of land to hold more deer. There is a greater need to take proactive steps like those enabled with this invention during the hunting season when deer tend to leave properties because they sense an area has too much human encroachment and therefore move to properties with less human scent. The type of simple and understandable product offered by the present invention is not available currently on the market. The present invention essentially translates a would-be human encroachment in a deer's area into an apparently friendly, even attractive guest to the area, even after the human has exited that area. The control of foreign scent dispersion preserves a hunting or other area so that it is more attractive to animals and thus more game rich through every season.

The present invention comprises not only the unique garment, patches, covers, scent placement, and other physical features but also comprises the methods of using the article and the unique scent distribution system for improving wildlife interactions described herein. The present invention uniquely, through its vapor barrier fabric, keeps scent from being deposited on the ground and vegetation around the hunting area. Prior inventions seeking to address a hunter's active scent have overlooked the need to block, cover and distract from the residual scents left by humans. The present invention addresses both active and residual scents to maximize enjoyment and interaction with nature and its inhabitants.

More specifically, and in a presently preferred embodiment, by way of example and not necessarily by way of limitation, the present invention is implemented through the use of hermetically sealed containers which are disposable. One-time use units ensure freshness of the garment cover or attractant scent and also ensure that the scent control properties have not been contaminated by human odors or from outside sources such as food, pets, car or ATV seats, gas stations, etc.

The present invention provides the only odor blocking and scent dispersal system that disperses deer cover scent and attractant scents properly, in a manner a deer would recognize as normal or natural. No single product provides both at the same time and even the combinations of products needed to do both are fatally flawed in their effectiveness because they come into direct contact with other scents at some point between the time a user applies them and the time a user enters the wildlife environment or distribute scents to unnatural areas. The present invention cures the current problems of market options as experienced by users trying to control their scent. Since the present invention goes on the hunter last, it is scent-free after the user exits his truck or other vehicle. Regular clothing, even scent eliminating clothing cannot accomplish this objective.

As compared with dedicated scent block clothing, the present invention offers a much less expensive and yet very effective way to control a hunter's "active scent." While the scent elimination clothing does a fair job at controlling human scent from within, it does not block 100% of the scents like the present invention can do with its non-breathable membrane. When compared with scent sprays, which can mask human odor, the present invention will more successfully mask, reduce or eliminate human odor with its scent-free, non-breathable barrier and the dedicated plant and animal scents applied to its exterior at predetermined locations and heights will maximize believability by animals.

For convenience, deer are repeatedly referenced in this disclosure; however, use of the present invention is intended for all game animals, including but not limited to, all deer species, elk, moose, whitetail, mike deer, etc. Although only deer, bucks, or does may be named in this application, inventor specifically intends that this product will find utility when used in association with all animals.

The foregoing has outlined, in general, the physical aspects of the invention and is to serve as an aid to better understanding the more complete detailed description which is to follow. In reference to such, there is to be a clear understanding that the present invention is not limited to the method or detail of construction, fabrication, material, or application of use described and illustrated herein. Any other variation of fabrication, use, or application should be considered apparent as an alternative embodiment of the present invention.

BRIEF DESCRIPTION OF THE DRAWINGS

The following drawings further describe by illustration, the advantages and objects of the present invention. Each drawing is referenced by corresponding figure reference characters within the "DETAILED DESCRIPTION OF THE INVENTION" section to follow.

LIST OF REFERENCES NUMERALS

Figure 1:
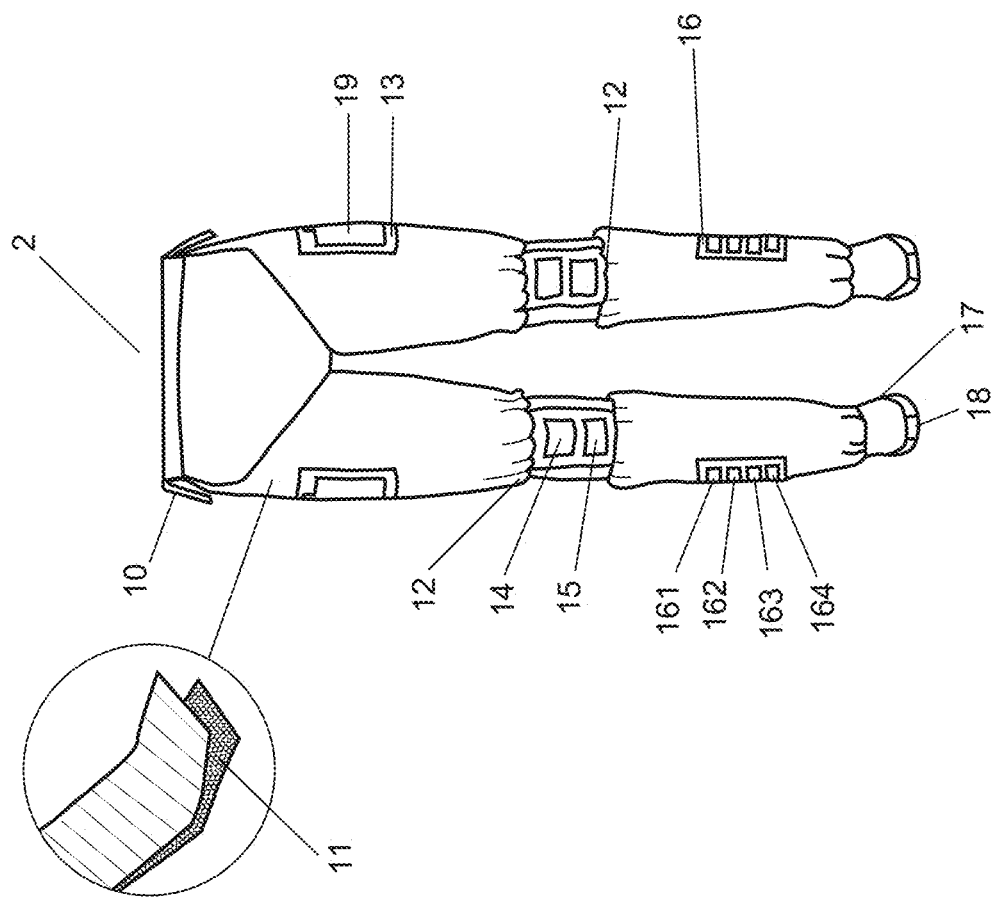
FIG. 1 is a schematic representation of the side of a deer and the front of the present invention as worn by a user depicting examples of relative heights or locations of smells as expected by animals. An enlarged section of a carbon ink print fabric is illustrated for additional detail.
Figure 1:
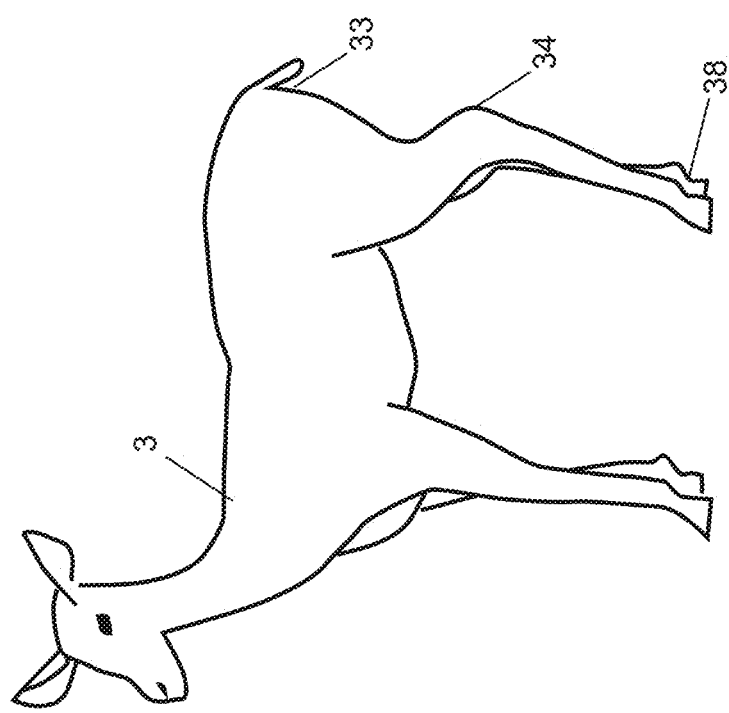

1 Hunting leg covers
2 User
3 Deer
33 Female Deer Hind
34 Deer Tarsal Glands
38 Deer foot
10 Ties or securing mechanism
11 Carbon Ink
12 Elastic
13 Female Deer/Doe Estrous Patches
14 Tarsal scent patches dominant buck
15 Tarsal scent patches for year-round buck
16 Food patches
161 Corn
162 Soybeans
163 Alfalfa
164 Acorn
17 Banded Foot Stirrup
18 Interdigital scent patches
19 Peeling protective cover
191 Thumb tab
192 Microencapsulation

DETAILED DESCRIPTION OF THE INVENTION

Referring to FIG. 1, the bottom torso of a user 2 is schematically depicted as standing next to a deer 3. The present invention consists of two tubular-shaped leg coverings that make up a garment 1. The garment 1 is worn by a user 2 in a way that permits free movement of the legs but also covers the user up to the user's crotch area. FIG. 1, through illustration and component numbering, shows the hunting garment 1 of the preferred embodiment with its scent-emitting patch locations and also depicts an approximate correlation of the height of each patch to the anatomy of the deer 3.

Figure 2:
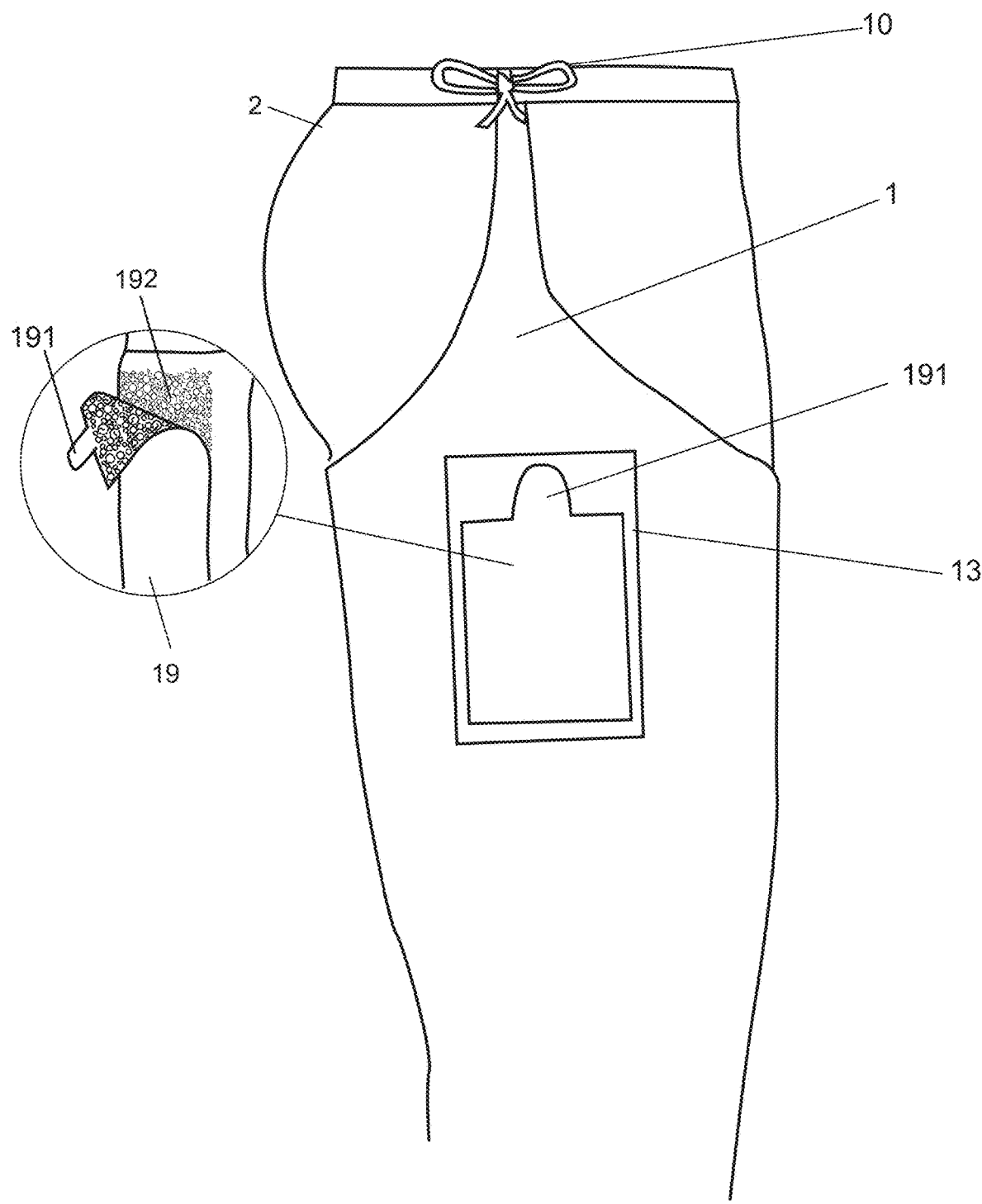
FIG. 2 is a schematic representation of a side view of the upper leg portion of the present invention, particularly highlighting a doe estrous scent dispersal structure detail. An enlarged section of a microencapsulation with protective cover is illustrated for additional detail.

Starting at the top of the garment 1 illustrated in FIGS. 1 and 2, there are securing closures such as ties 10 on each side that will attach to the user 2 or cooperate with user's other clothing whether the garment is slid on or secured like chaps. The garment 10 could be tied around a belt, belt loops or other clothing worn underneath the present invention. Alternatively, two or more strings or straps may be tied or fastened to one another to secure the garment similar to chaps on the user.

With continuing reference to FIGS. 1 and 2, below each of the ties 10 are the first set of a plurality of scent dispersal structures. In the preferred embodiment, the first set of scent dispersal structures serve as a section of doe or female estrous scent patches 13. These patches are placed highest on the garment 1 to correspond to the approximate vertical location of the urethra 33 on the deer 3. The first set of scent dispersal patches occur at an approximate height of eighteen to thirty-six inches from ground level. The height is determined relative to deer or other game animal anatomy rather than the user or the garment's waist. Some locational consistency will be observed on the garment in spite of pant leg size and length variations. For most users, this locational parameter will call for placement on the upper leg between the knee and the waist, and the female animal scent will occur on the exterior of the pant leg at or near the thighs or hips. The estrous scent patches 13, like the other scent dispersal structures, are on the exterior of the garment. They are enclosed by a removeable, protective cover 19 and will not secrete the estrous scent until such time as the user peels back or removes the protective cover 19.

A larger, side view of the ties 10 and estrous tab 13 can be seen in FIG. 2. The patches in each instance of the invention may be impregnated with a one-time use scent that either attracts, covers, masks or otherwise distracts from the scent of the user 2. In the preferred embodiment, the patches consist of microencapsulated clusters 192 beneath the protective cover 19 which is shown within the magnification bubble of FIG. 2. When the user pulls on the tab 191 to remove the protective cover 19, it breaks the microencapsulated clusters 192 to release the scent contained in the microcapsules. FIG. 2 illustrates one example of a removable patch adhered to an individual backing. Other coupling methods can be utilized for the scents to be selectively covered and exposed with individually paired covers or with grouped covers sharing a larger backing. Alternative embodiments of the invention may permit repetitive application of drops of the applicable scent to the respective patches and in that case the protective covers could be reusable. For this alternative version, expense may be reduced, but the user must be unwaveringly careful to reduce or eliminate scent contamination between uses or during use or storage.

Figure 3:
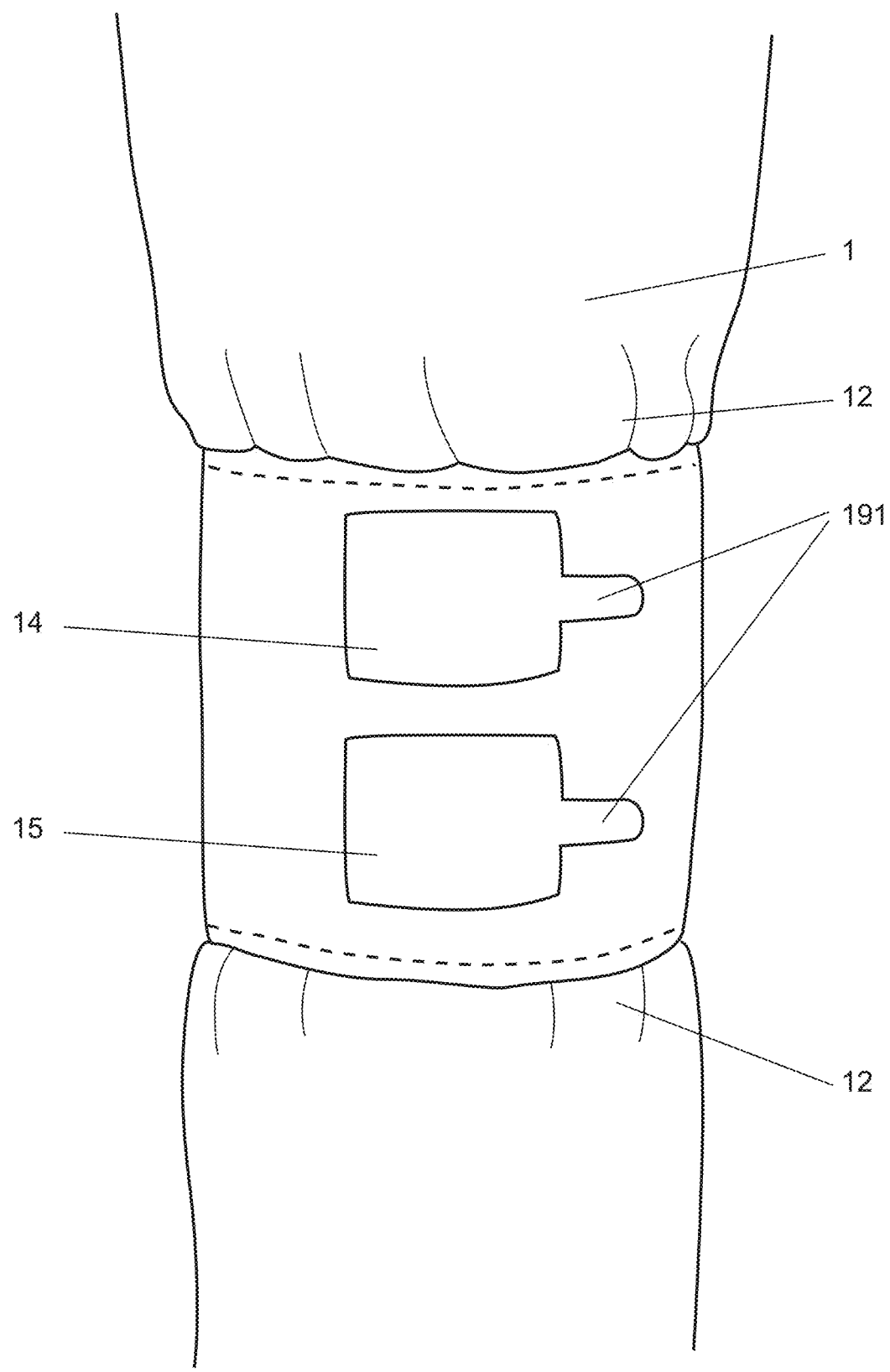
FIG. 3 is a schematic representation of a front view of the middle-leg portion of the present invention, particularly highlighting a tarsal scent dispersal structure detail.

With continued reference to the garment 1 depicted in FIG. 1, elastic banding 12 is incorporated into the garment 1 at locations above and below the user's knee to cinch and gather the pant leg. The elastic banding 12 helps to secure the garment 1 when the user 2 is moving and also ensures the vertical location of the scent patches is maintained. As shown in FIG. 3, between the two elastic bands 12 is located the next set of scent dispersal patches of the preferred embodiment. These patches are placed at a height to nearly correlate with the height of the tarsal glands 34 of a deer 3. FIG. 1 includes a schematic representation of an example tarsal gland 34 location—at the bend of the animal's hind legs. The scents discharged from the tarsal glands telegraph information among animals. Researchers have isolated scents for male animal dominance scents, particularly dominant and subordinate males in deer populations. In the present invention, there are two tarsal patches for a user to choose from, depending on the time of year. The upper tarsal patch 14 is covered by a removable, protective cover 19 and when removed will emit a dominant buck scent. The lower tarsal patch 15 has its own removable, protective cover 19 and emits a year-round buck or subordinate male scent after the cover 19 has been removed. In the preferred embodiment the scent will be contained within a microencapsulation cluster 192 as depicted in the magnification portion of FIG. 2. The elastic bands 12 keep the tarsal scent patches 14, 15 at a height nearly adjacent to the height of the animal tarsal glands 34 and dispense the desired buck scent(s) at a predictable height after the pull tab 191 is used to remove the protective cover 19. An enlarged view of this second section of scent dispersal structures can be seen in FIG. 3.

Figure 4:
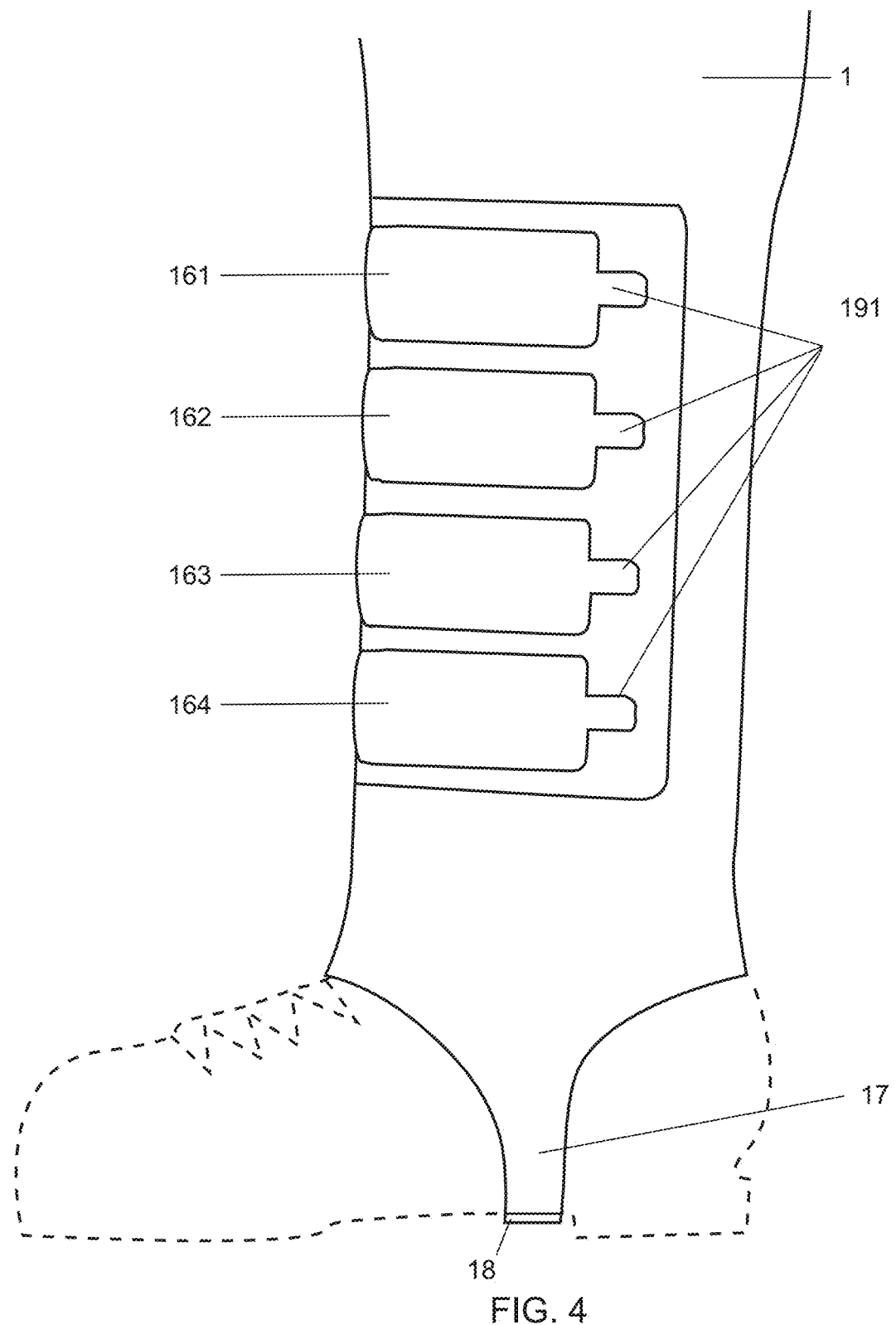
FIG. 4 is a schematic representation of a side view of a lower leg and foot portion of the present invention, particularly highlighting food scent dispersal structure details and the banded boot stirrup with its own interdigital glandular scent patch.

Further review of FIG. 1 shows multiple patches referenced as the plant, and particularly food patches 16 running down each side of the garment 1. FIG. 4 is enlarged to show more detail of this third section of a set of scent dispersal structures. The food patches 16 are positioned on the lower leg area between the ankle and knee of the user 2. When employed, these patches leave the selected scent on vegetation or generally in the air at a height corresponding to the food height which is consistent with where an animal would seek that food. Various food scents are contemplated and some examples are given but could be altered as needed. A user 2 may elect the appropriate scent for the geographic area where he will be using the present invention. Collectively, FIGS. 1 and 4 show the preferred embodiment with four food patches 16 on each leg. Modifications to food type as well as alternative arrangements between legs may be beneficial depending on the season or environment. Once a user determines the food source in the area, the user 2 will grasp the appropriate thumb tab 191 of the removable protective covers 19 to peel off the cover and expose the elected scent-emitting patches or fracture the coating of the capsules in the microencapsulation to release the interior particles. The thumb tabs 191 which protrude from the protective covering patches minimize human touching of the garment. In the embodiment shown in FIG. 4, the patches shown correspond to the scents deer expect for corn 161, soybeans 162, alfalfa 163 and acorns 164. In this example embodiment, the food patches 16 include corn 161, soybeans 162, alfalfa 163, and acorn 164 in separate patch cover areas. In certain applications, the food smells could be combined so that they were covered and revealed by the removal of one patch. See FIGS. 1 and 4. In alternative embodiments the food patches 16 could include other scents and alternative number of food patches 16 on each leg. Similar to the estrous and tarsal scent sections described above, the food patches 16 would also include removable, protective covers 19 so that only the appropriate, scents expected by the animals would be revealed and dispersed to the animal's environment after the covers are removed. The microencapsulation clusters 192 could again be used as the scent distribution mechanism in this third section of scent dispersal structures.

With continuing reference to FIG. 4, banded stirrups 17 occur at the very bottom of the garment 1 for optionally securing the pant leg over the user's footwear and under the shoe sole between the user's toe and heal. The foot stirrup 17 includes the fourth set of scent dispersal structures, specifically an interdigital scent patch 18 (see FIG. 1) that correlates with the vertical location of the interdigital gland on the foot 38 of an animal such as a deer. The interdigital gland is in the cleft between the toes of the front hooves. The interdigital section 18 of scent dispersal structures will emit an odor like that associated with the secretions of the interdigital gland of an animal. FIG. 4 shows a closer side view of the stirrup 17 affixed underneath a user's boot.

The garment 1 is prepared and manufactured under sterile conditions to keep contaminating odors away from the garment. The scent dispersal structures are manufactured to keep the respective scent extracts within their designated areas and prevent seeping into the garment itself. FIGS. 1-4 show variations in configurations that may be employed for backing or securing the scent patches to the exterior of the garment and away from the user's clothes. In the preferred embodiment, the scents occur on the patches that remain on the exterior of the clothing and those scents are revealed when the patches are removed and either discarded or retained to recover the scents after use. The preferred embodiment uses microcapsules to apply a coating over the scent particles or liquid droplets. The style of manufacturing is referred to as microencapsulation. When the cover is removed, the capsules are broken and the scents exposed for discharge.

Prior to leaving the sterile manufacturing environment, the garment 1 is placed into a hermetically sealed bag. The airtight packaging is then shipped to users or to distributing vendors. The garment 1 should remain in the hermetically sealed bag until ready for wear by the user. A user could be a hunter, photographer or wildlife management personnel wishing to avoid scent contamination of the trail, the foliage or vegetation and to more frequently experience interactions with animals. Once the user arrives at the destination where he will be walking, it is then appropriate to remove the garment from the hermetically sealed bag, place the garment over his other clothes, and begin his journey. The scent can only be emitted when the user 2 peels away the exterior cover 19 by pulling on the finger tabs 191.

The two tubular shaped leg coverings may alternatively be formed as leggings or chaps. The garment will be provided in a range of sizes varying from small to extra-large or from petite to tall, for example. The leg coverings are approximately 2-3 feet in length and 6-12 inches in diameter for each leg but measurements may vary as needed for appropriate user sizing.

The leg coverings are constructed of any acceptable thin, quiet, and scent free materials such as textile, fabric, rubber, latex, blown or cast film, Tyvek, or materials with features meeting the objectives of the present invention. The material necessarily creates a barrier to keep the user's scent contained underneath the garment. The preferred embodiment of the garment 1 will be constructed of Tyvek material or a vapor barrier fabric capable of preventing the deposit of active or residual human scents on the ground around the hunting area. The Tyvek material is an odor control textile that will block, retain or contain odors associated with the user within the interior of the pants. Carbon ink fabric may be incorporated into the interior of the garment to absorb human smells. The carbon ink 11 could be printed in a continuous pattern to keep static electricity from building up between the garment 1 and the user's clothing underneath. An example of the carbon ink 11 is shown in FIG. 1 with a pattern of small circles, but other patterns are anticipated. FIG. 1 is showing the exterior material and the carbon ink as different layers but in the preferred embodiment the carbon ink will be printed directly onto the interior of the material.

The exterior desirably includes microencapsulated scents to attract, cover, or conceal scents when the protective patch covers are removed. The scent impregnated sections contain for dispersal scents that correlate with plant cover scents or food source scents are located on the garment covering consistent with where those scents occur in nature. Typically, the patches with these scents are located on the garment at a height between 6-12 inches above the ground. The animal scent structures vary depending on the source of emission from the animal's glands or reproductive organs (such as pheromones). The scent impregnated sections contain for dispersal scents correlating with male animal tarsal glandular secretions are located on the garment covering at a height between 12-18 inches above the ground. Scent impregnated sections emitting scents consistent with female estrous cycle excretions or glandular excretions are located on the garment covering at a height between 18-36 inches above the ground. The scent impregnated sections contain for dispersal scents corresponding with animal interdigital glandular secretions are located on the garment covering at a height between 0-3 inches above the ground.

Figure 5:
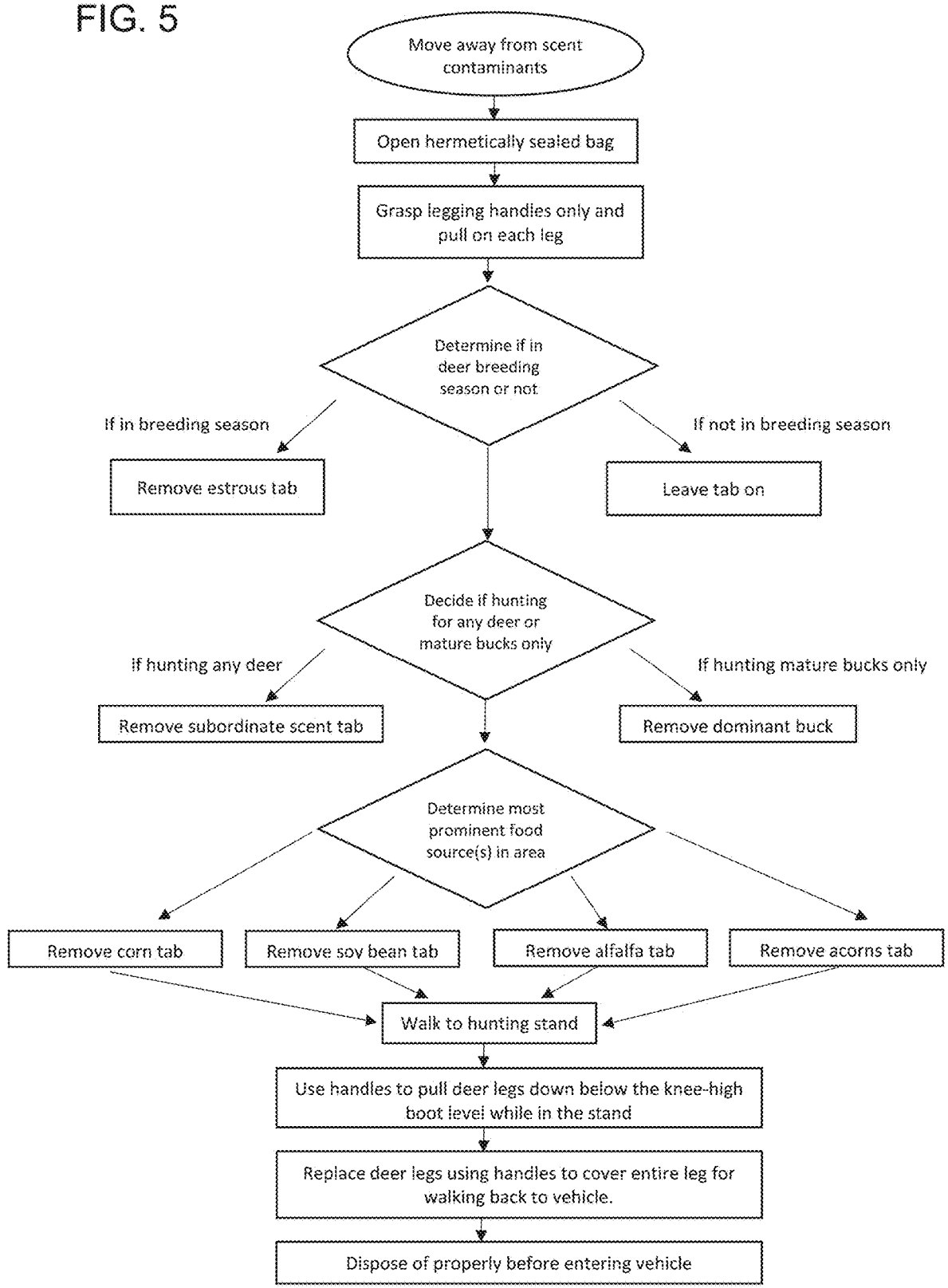
FIG. 5 is a flow diagram outlining a decision tree for use of the preferred embodiment of the present invention.

FIG. 5 shows a flow chart demonstrating the decisions a user must make to properly use the present invention. Specifically, the diagram provides options and a decision tree to be followed by a user moving from his vehicle to a hunting stand, and then returning to the vehicle. In the diagram, the invention is referred to by its trademark, "Deer Legs". The first requirement calls for the user to move away from contaminants prior to opening the packaging. The user should take special care not to put the garment on while still in the vehicle. Next, the user should take steps to ensure he does not touch the exterior of the garment or at least keeps the touching of the garment to a minimum. Preferably, the user will only grasp the handles, also described above as the ties, to pull the covering over each leg. This will prevent the body oils from transferring onto the garment. The user keeps the garment up by securing the ties to a belt, belt loops or other point of attachment near the user's waist. Once the user has secured the garment to his or her body, the flow chart in FIG. 5 provides options for use of the garment and removal of selected protective scent patch covers depending on the answers to various questions related to season and objectives. First, the user determines if it is breeding season for the animal in question and then removes the protective cover for the respective patch which would be most favorable to the breeding conditions. The user will first decide whether to remove the cover 19 from the estrous patch 13 or, if it is not breeding season then let the cover 19 remain secured to estrous patch 13. The next step in the decision tree for the user as illustrated by the flow chart is for the user to determine whether the user is seeking deer of either sex or age, or only mature bucks and whether it is mating season or not. If mature bucks only are preferred, then the user would want to remove the cover to expose the dominant buck scent 14 to draw in mature bucks. Otherwise, the user would expose the subordinate buck scent 15 for a more general deer cover scent. As described above, the user can elect to remove a food scent tab depending on the food prominent in the hunting area.

As noted in FIG. 5, once the hunter gets to his hunting stand and will be sitting to wait, it is recommended that ties 10 be removed and the garment lowered down below the knees. This is because it is anticipated that the hunter will rest his gun or hands in his lap while waiting for his prey. Such interactions with the garment may lead to human-scent and other scent contamination on the exterior of the garment textile which will result in undesirable or unintended odor transfers as the user returns to his vehicle. Additionally, since the garment must be non-breathable, removal while on stand allows the legs to breathe in between commutes. When the user wishes to return to his vehicle, the garment should be reattached to the waist before the user proceeds back into the animal's environment. The user may then carefully reseal the garment in its bag, or for the preferred embodiment, the garment is intended to be a one-use article that would be disposed of upon return to and entering of the vehicle.

The preferred embodiment discussed above and shown in the drawings are specific to deer. Alternative embodiments are anticipated for other game animals such as elk, moose and other mammals. The garment could also be tailored to specific species of deer such as white tail or mule deer. Vegetation or foliage at various levels of the natural canopy may be targeted for scent replication including tree branches, cattails, berries, or similar scents that occur at higher flora or fauna levels. It is further anticipated that the garment could be provided as other apparel items such as full pants, top jackets, shirts, jumpsuits or any other article of clothing or accessories like gloves, satchels, or hats.

It is further intended that any other embodiments of the present invention which result from any changes in application or method of use or operation, method of manufacture, shape, size, or material which are not specified within the detailed written description or illustrations contained herein but which are considered apparent or obvious to one skilled in the art, are within the scope of the present invention.

I claim:

1. An improved garment covering for legs of a user entering nature comprising a combination of:
    odor control textile constructed to fit over and removably secure to the legs of the user, the odor control textile having an interior and an exterior, and
    a plurality of scent dispersal structures located on the exterior of the odor control textile at predetermined locations and heights,
        each of the plurality of scent dispersal structures further comprised of a scent impregnated section and a removable protective cover paired to selectively enclose the scent impregnated section.

2. The garment covering of claim 1 wherein the odor control textile retains odors emitted by the user within the interior.

3. The garment covering of claim 1 wherein the scent impregnated sections contain for dispersal scents that correlate with plant cover scent.

4. The garment covering of claim 3 wherein the scent impregnated sections correlating with the plant cover scent are located proximate to a lower area of the legs.

5. The garment covering of claim 3 wherein the scent impregnated sections correlating with the plant cover scent are located on the garment covering at a height between 6-12 inches above ground.

6. The garment covering of claim 3 wherein the plant cover scent further comprises a food source scent.

7. The garment covering of claim 6 wherein the food source scent is selected from a group consisting of corn, soy beans, alfalfa, and acorn.

8. The garment covering of claim 1 wherein the scent impregnated sections contain for dispersal scents that correlate with an animal scent.

9. The garment covering of claim 8 wherein the animal scent is selected from a group consisting of glandular, pheromones, and reproductive scents.

10. The garment covering of claim 1 wherein the scent impregnated sections contain for dispersal scents that correlate with male animal tarsal glandular secretions.

11. The garment covering of claim 10 wherein the scent impregnated sections correlating with male animal tarsal glandular secretions are located proximate to at least one knee area of the legs.

12. The garment covering of claim 10 wherein the scent impregnated sections correlating with male animal tarsal glandular secretions are located on the garment covering at a height between 12-18 inches above ground.

13. The garment covering of claim 1 wherein the scent impregnated sections contain for dispersal scents that correlate with female animal excretions.

14. The garment covering of claim 13 wherein the scent impregnated sections correlating with female animal excretions are located proximate to an upper area of the legs.

15. The garment covering of claim 13 wherein the scent impregnated sections correlating with female animal excretions are located on the garment covering at a height between 18-36 inches above ground.

16. The garment covering of claim 1 wherein the scent impregnated sections contain for dispersal scents that correlate with animal interdigital glandular secretions.

17. The garment covering of claim 16 wherein the scent impregnated sections correlating with animal interdigital glandular secretions are located proximate to at least one foot area of the legs.

18. The garment of claim 16 wherein the scent impregnated sections correlating with animal interdigital glandular secretions are located on the garment covering at a height between 0-3 inches above ground.

19. An improved garment covering for legs of a user entering nature comprising:
    odor control textile constructed to fit over the legs of the user,
        the odor control textile having an interior and an exterior, and
    a plurality of sets of scent dispersal structures located on the exterior of the odor control textile at predetermined locations and heights,
        the plurality of sets of scent dispersal structures impregnated with scents corresponding to heights approximating the height at which those scents occur in nature,
        each of the plurality of sets of scent dispersal structures having features to selectively reveal the scents, and
    fastening mechanisms which secure the garment covering to the user in order to maintain the predetermined locations and heights for the plurality of sets of scent dispersal structures.

20. The garment covering of claim 19 wherein the plurality of sets of scent dispersal structures further comprise a first set of scent dispersal structures located near an upper leg area of the user, the first set of scent dispersal structures impregnated with female animal estrous scents.

21. The garment covering of claim 20 wherein the plurality of sets of scent dispersal structures further comprise a second set of scent dispersal structures located near at least one knee of the user, the second set of scent dispersal structures impregnated with male dominance scents.

22. The garment covering of claim 21 wherein the plurality of sets of scent dispersal structures further comprise a third set of scent dispersal structures located near a lower leg area of the user, the third set of scent dispersal structures impregnated with food scents.

23. The garment covering of claim 22 wherein the plurality of sets of scent dispersal structures further comprise a fourth set of scent dispersal structures located near at least one foot of the user, the fourth set of scent dispersal structures impregnated with animal interdigital glandular scents.

24. The garment covering of claim 19 wherein the features are further comprised of a protective cover to selectively reseal the scents.

25. The garment covering of claim 19 wherein the fastening mechanisms are further comprised of a set of waist ties, above-knee cinching, below-knee cinching, and a banded foot stirrup.

26. An improved hunting leg cover for a user entering nature comprising:
   non-breathable textile constructed to cover both legs and forming an interior and an exterior, the non-breathable textile retaining odors emitted by the user within the interior, and
   a plurality of sections of scent dispersal structures located on the exterior of the non-breathable textile,
      a first section of scent dispersal structures located near an upper leg area of the user, the first section of scent dispersal structures impregnated with female animal estrous scents,
      a second section of scent dispersal structures located near at least one knee of the user, the second section of scent dispersal structures impregnated with tarsal scents selectable between male animal dominance indicator scents,
      a third section of scent dispersal structures located near a lower leg area of the user, the third section of scent dispersal structures impregnated with selectable food scents, and
      a fourth section of scent dispersal structures located near at least one foot of the user, the fourth section of scent dispersal structures impregnated with animal interdigital glandular scents,
      each scent dispersal structure further comprised of a scent emitting microcapsules and a cover having a thumb tab, the cover formed to removably expose the scent emitting microcapsules,
   a fastener to secure the hunting leg cover to the user near waist height,
   a cinching mechanism supporting locational orientation of the second section of scent dispersal structures located near the at least one knee,
   a banded foot stirrup to secure the hunting leg cover to the foot of the user.

* * * * *